(12) United States Patent  
Yasunobu

(10) Patent No.: US 7,046,394 B2  
(45) Date of Patent: May 16, 2006

(54) FACSIMILE APPARATUS

(75) Inventor: Mitsuo Yasunobu, Fukuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 815 days.

(21) Appl. No.: 09/942,028

(22) Filed: Aug. 30, 2001

(65) Prior Publication Data

US 2002/0051259 A1  May 2, 2002

(30) Foreign Application Priority Data

Aug. 30, 2000  (JP)  ............................. 2000-260409

(51) Int. Cl.
  *G06K 15/00* (2006.01)
  *H04N 1/46* (2006.01)

(52) U.S. Cl. .................. 358/1.9; 358/2.1; 358/515; 358/520; 358/530

(58) Field of Classification Search .............. 358/1.9, 358/2.1, 500, 515, 516, 520, 527, 530; 348/659, 348/107; 235/375; 711/163; 382/162, 167
See application file for complete search history.

(56) References Cited

U.S. PATENT DOCUMENTS

| | | | | |
|---|---|---|---|---|
| 4,636,848 A * | 1/1987 | Yamamoto | ............ | 348/107 |
| 4,831,434 A * | 5/1989 | Fuchsberger | ............ | 358/521 |
| 4,900,902 A * | 2/1990 | Sakakibara | ............ | 235/375 |
| 5,940,144 A * | 8/1999 | Lenz et al. | ............ | 348/679 |
| 6,204,934 B1 * | 3/2001 | Minamino | ............ | 358/1.9 |
| 6,446,177 B1 * | 9/2002 | Tanaka et al. | ............ | 711/163 |
| 6,621,526 B1 * | 9/2003 | Yamagishi | ............ | 348/659 |
| 6,809,836 B1 * | 10/2004 | Nobuta et al. | ............ | 358/1.9 |
| 2002/0010003 A1 * | 1/2002 | Uchikawa | ............ | 455/557 |
| 2002/0089702 A1 * | 7/2002 | Yoshitani et al. | ............ | 358/448 |
| 2002/0099778 A1 * | 7/2002 | Kogure et al. | ............ | 709/206 |
| 2002/0174199 A1 * | 11/2002 | Horvitz | ............ | 709/220 |
| 2003/0035157 A1 * | 2/2003 | Kanai | ............ | 358/518 |
| 2003/0151756 A1 * | 8/2003 | Yamazaki et al. | ............ | 358/1.9 |
| 2004/0018851 A1 * | 1/2004 | Koenck et al. | ............ | 455/550.1 |

(Continued)

FOREIGN PATENT DOCUMENTS

| | | |
|---|---|---|
| JP | 2000-134442 | 5/2000 |
| JP | 2001-24868 | 1/2001 |

*Primary Examiner*—Jerome Grant, II  
(74) *Attorney, Agent, or Firm*—McDermott Will & Emery LLP

(57) ABSTRACT

Having a memory card input and output unit, data conversion management means for judging the type of image data receivable at the destination side, first converting means for converting from the YCbCr format used in the memory card into the RGB format, second converting means for converting from the RGB format into the L*a*b* format used in the color facsimile apparatus and monochromatic format converting means, if the data to be transmitted is the color image data of the memory card, the data is once converted into RGB format in the first converting means, and then converted into L*a*b* format in the second converting means, and in the case of the image data being read by the scanner, the data is directly converted into L*a*b* format in the second converting means.

If the type of image data receivable at the destination side judged by the data conversion management means is color image, the data of L*a*b* format obtained in the second converting means is transmitted directly. If the type of image data receivable at the destination side is monochromatic image only, the data of L*a*b* format obtained in the second converting means is transmitted by converting into monochromatic format, and therefore if the destination side is a monochromatic facsimile apparatus, the color image can be automatically transmitted as monochromatic image.

33 Claims, 6 Drawing Sheets

U.S. PATENT DOCUMENTS

2004/0218825 A1* 11/2004 Graffagnino ................ 382/240
2004/0233484 A1* 11/2004 Seko et al. ................ 358/523
2005/0108747 A1* 5/2005 Omoigui ...................... 725/32
2005/0155060 A1* 7/2005 Sato et al. .................... 725/42

* cited by examiner

FACSIMILE APPARATUS

FIELD OF THE INVENTION

The present invention relates to a facsimile apparatus, more particularly to a facsimile apparatus capable of receiving desired data such as image data and audio data from a communication line and saving in a memory card, and also transmitting color image data stored in a memory card or color image data read in by a scanner to a monochromatic facsimile apparatus.

BACKGROUND OF THE INVENTION

An ordinary facsimile apparatus scans the image to be transmitted by a scanner to take in the image information, and transmits the image, or receives the transmitted image, and prints or displays it.

Recently, a digital still camera is developed as an image input device into a personal computer, and various memory cards are used as means for storing the still images. A memory card recording the still image is inserted into the memory card input and output unit, and is read and processed, and the image data is taken into the personal computer.

If the image is processed by the personal computer by using the memory card, to send the processed image to a distant place, first the image is printed out, and sent by the facsimile apparatus. That is, the saved electronic data is printed out on paper as visible information, and is then converted into electronic data again, and the memory medium is not utilized effectively.

On the other hand, the present applicants propose to provide the facsimile apparatus with a memory card input and output unit, load it with a memory card, and transmit the stored data directly from the card. This facsimile apparatus upgrades the function of the facsimile apparatus outstandingly, and expands the possibility of the facsimile apparatus.

The existing facsimile apparatus, however, is designed only to read the image printed on the original document by means of a scanner, and transmit it, and cannot transmit the image taken by a digital camera and stored in the memory card loaded in the memory card input and output unit. The reason is that the image data taken by the digital camera and stored in the memory card and the image data transmitted and received by the facsimile apparatus are different in the compression format of image data. The former is the data format for digital image processing by the personal computer, and the latter is the data format for transmission and reception by the facsimile apparatus, and the both formats have been standardized and developed separately, and are hence different. In the latter case, in particular, the data format differs between the monochromatic image and color image, and the monochromatic image data format is also divided into plural types, and data format mismatching occurs everywhere.

Therefore, if the destination side facsimile apparatus is a monochromatic facsimile apparatus, the color image stored in the memory card cannot be transmitted because the data format is mismatched in double senses of meaning, and therefore the image is once printed out as monochromatic image, and it is transmitted by the facsimile apparatus. As a result, the electronic data is meaningless.

Accordingly, by filling in the gap of these data formats, it has been requested to develop a facsimile apparatus capable of automatically converting the data format of the color image data stored in the memory card, if the destination side is a monochromatic facsimile apparatus, and transmitting as if there were no mismatching in data formats.

SUMMARY OF THE INVENTION

To improve the conventional problems, it is hence an object of the invention to present a facsimile apparatus capable of transmitting by converting the image data obtained by a digital camera or the like automatically into a facsimile transmission format. Further, if the destination side is a monochromatic facsimile apparatus, the invention presents a facsimile apparatus capable of transmitting color image data automatically as monochromatic image data.

To achieve the objects, a first aspect of the invention comprises a modem for modulating the data to be transmitted through a communication line and demodulating the received data, a scanner for reading the original image, a memory card input and output unit for loading a memory card for storing image data, and writing data into the memory card and reading data out of the memory card, first converting means for converting from the YCbCr format used in the memory card into the RGB format, and second converting means for converting from the RGB format into the L*a*b* format used in the color facsimile apparatus, in which if the data to be transmitted through the communication line is the image data read in by the scanner, the data is converted by the second converting means, or if the data to be transmitted through the communication line is the color image data in the memory card, the data is once converted into the RGB format by the first converting means, and is then converted into the L*a*b* format by the second converting means.

Therefore, whether the transmission image data is read out from the memory card or is read from a paper original by the scanner, the data is automatically converted into an adequate image data format and transmitted.

A second aspect of the invention comprises a modem for modulating the data to be transmitted through a communication line and demodulating the received data, a scanner for reading the original image, a memory card input and output unit for loading a memory card for storing image data, and writing data into the memory card and reading data out of the memory card, data conversion management means for judging the type of image data receivable at the destination side, first converting means for converting from the YCbCr format used in the memory card into the RGB format, second converting means for converting from the RGB format into the L*a*b* format used in the color facsimile apparatus, and monochromatic format converting means for converting from the L*a*b* format used in the color facsimile apparatus into the monochromatic format, in which if the data to be transmitted through the communication line is the image data read in by the scanner, the data is converted from the RGB format into the L*a*b* format by the second converting means, if the data to be transmitted through the communication line is the color image data in the memory card, the data is once converted into the RGB format by the first converting means, and is then converted into the L*a*b* format by the second converting means, if the type of image data receivable at the destination side judged by the data conversion management means is the color image, the data of the L*a*b* format obtained in the second converting means is sent out to the communication line, or if the type of image data receivable at the destination side judged by the data conversion management means is the monochromatic image, the data of the L*a*b* format obtained in the second converting means is further converted into the monochromatic format by the monochromatic format converting means.

Therefore, whether the type of image data receivable at the destination side is monochromatic image data or color image data, the data is automatically converted into an adequate image data format and transmitted to the facsimile apparatus at the destination side. Or in the case of color image data read by the scanner, if the type of image data receivable at the destination side is monochromatic, it is automatically converted into monochromatic image data, and transmitted to the monochromatic facsimile apparatus at high picture quality. Besides, the necessary second converting means can be shared whether the destination side is a color facsimile apparatus or a monochromatic facsimile apparatus.

A third aspect of the invention comprises a modem for modulating the data to be transmitted through a communication line and demodulating the received data, a memory card input and output unit for loading a memory card for storing image data, and writing data into the memory card and reading data out of the memory card, data conversion management means for judging the type of image data receivable at the destination side, and data format converting means for converting the data once into color facsimile transmission and destination data format and then converting into monochromatic facsimile transmission data format if the type of image data receivable at the destination side judged by the data conversion management means at the time of transmission is monochromatic image and the data to be transmitted is color image data.

Therefore, whether the type of image data receivable at the destination side is monochromatic image data or color image data, the data is automatically converted into an adequate image data format and transmitted to the facsimile apparatus at the destination side. Or in the case of color image data being read, if the type of image data receivable at the destination side is monochromatic, it is automatically converted into monochromatic image data, and transmitted to the monochromatic facsimile apparatus at high picture quality.

A fourth aspect of the invention comprises a modem for modulating the data to be transmitted through a communication line and demodulating the received data, a memory card input and output unit for loading a memory card for storing image data, and writing data into the memory card and reading data out of the memory card, a data memory unit for storing the transmission and reception data, data conversion management means for judging the type of image data receivable at the destination side, and data format converting means for converting the format of the image data to be transmitted or received, in which if the type of image data receivable at the destination side judged by the data conversion management means at the time of transmission is monochromatic image data and the data to be transmitted is color image data, the data format converting means encodes the data into the L*a*b* format for color facsimile transmission and reception, and it is further converted into the MH data format by the monochromatic format converting means, if type of image data receivable at the destination side judged by the data conversion management means at the time of reception is monochromatic image data, the received data of MH format is unchanged or is converted into a specified format, or if type of image data receivable at the destination side judged by the data conversion management means at the time of reception is color image data, the data is converted into the RGB format, and the RGB format is further converted into the YCbCr format.

Therefore, if the destination side is a monochromatic facsimile apparatus, color image data is automatically converted into monochromatic image data and transmitted, and any image data received through the communication line can be converted into the data format for image processable memory card and is stored in the memory card.

The data stored in the memory card in these aspects of the invention can be easily processed digitally by personal computer or the like.

In these aspects of the invention, as the memory card, a memory card with copyright protection function may be also used, and the security of the received data is enhanced and the copyright can be protected. As such memory card with copyright protection function, for example, SD (security digital) memory card is used. This SD memory card is excellent in respect of security.

DESCRIPTION OF THE PREFERRED EMBODIMENT

The applicants have devised a facsimile apparatus which comprises a memory card input and output unit, data conversion management means for judging the type of image data receivable at the destination, and a data format converter for converting into the image data format receivable at the destination, and therefore the image data to be transmitted, whether being read out from the memory card or being read from a paper original by the scanner, can be converted into the type of image data receivable at the destination.

Figure 1:
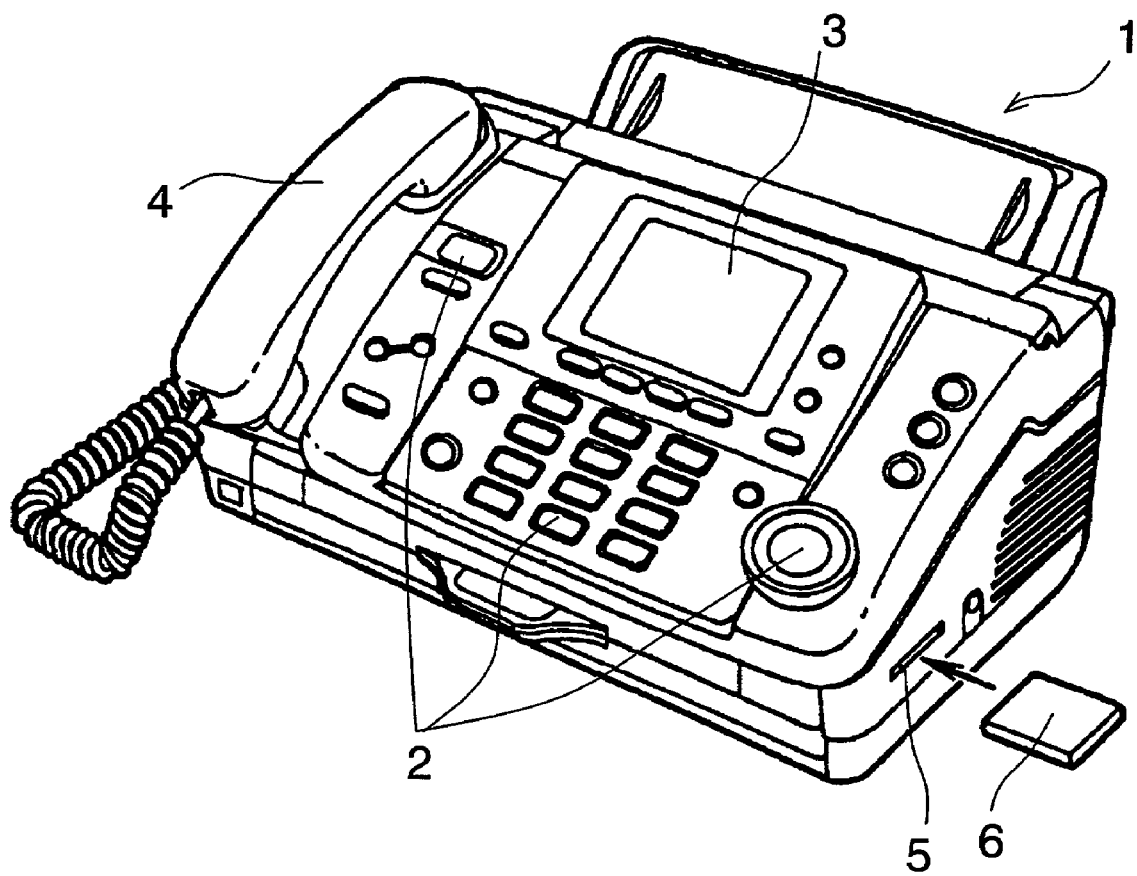
FIG. 1 is a perspective view showing an appearance of a facsimile apparatus in an embodiment of the invention.
Figure 2:
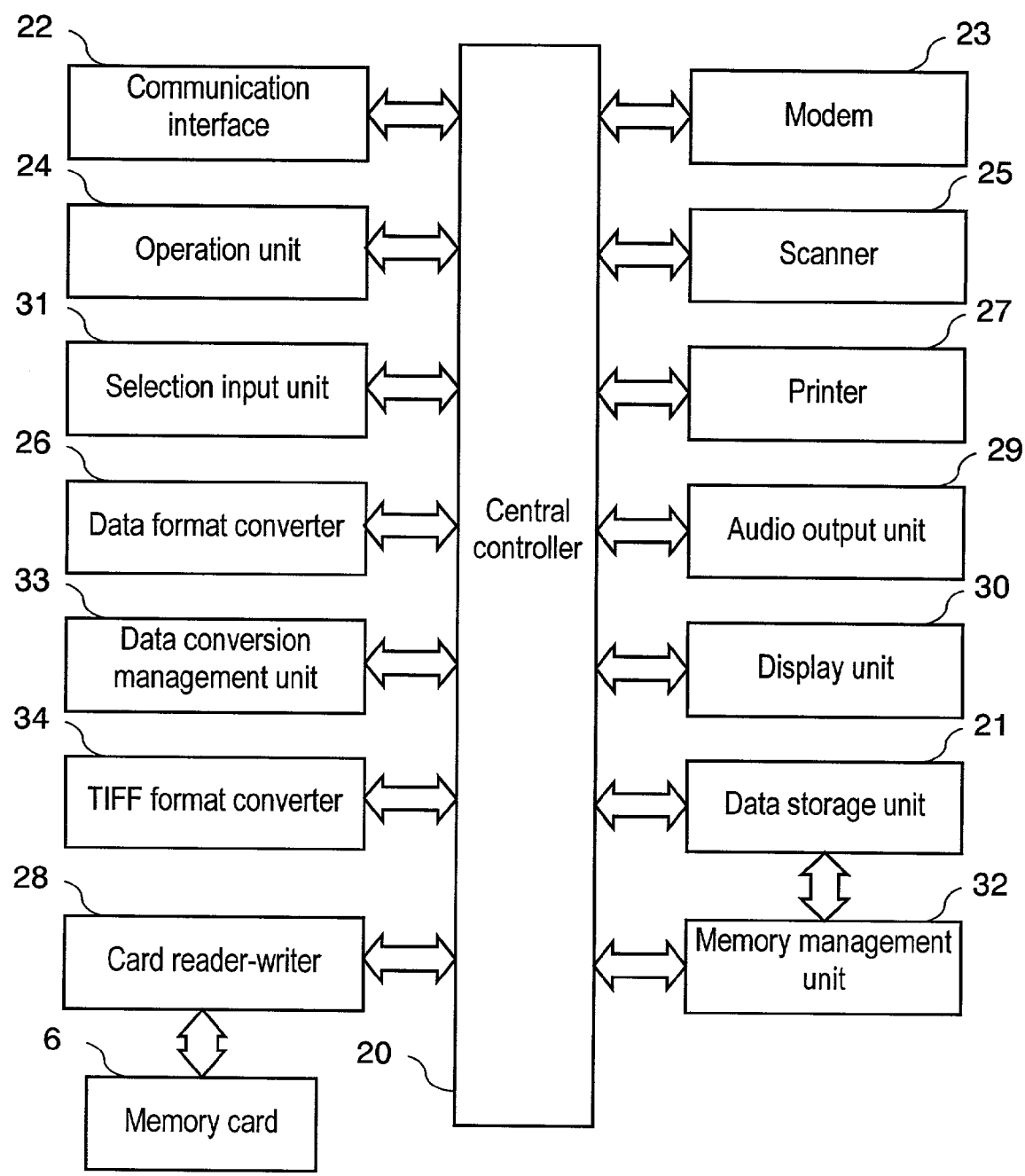
FIG. 2 is a block diagram showing a configuration of the facsimile apparatus in the embodiment of the invention.
Figure 3:
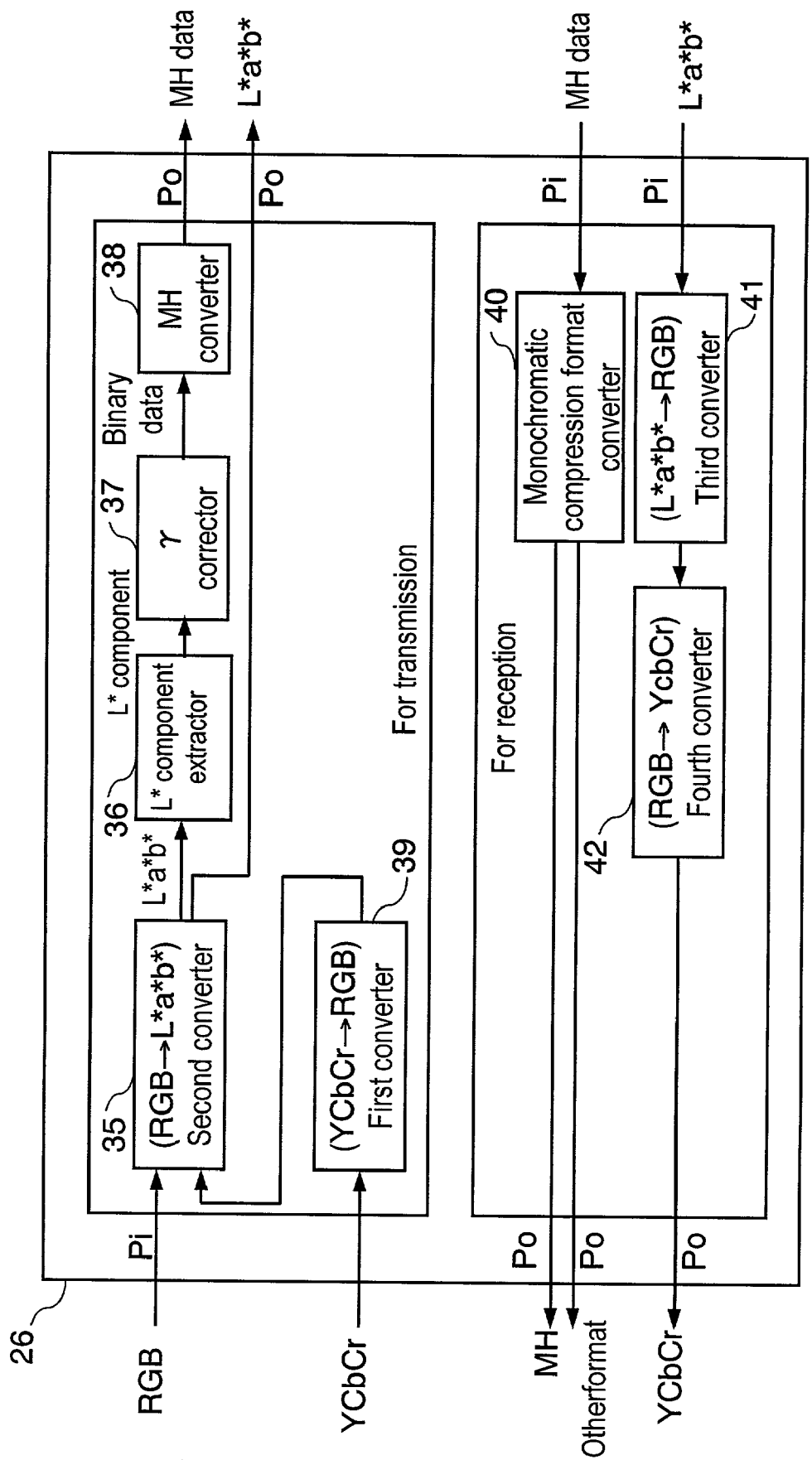
FIG. 3 is a diagram showing a detailed configuration of a data format converter of the facsimile apparatus in the embodiment of the invention.

An embodiment of the invention is described below while referring to the accompanying drawings. FIG. 1 is a perspective view showing an appearance of a facsimile apparatus in an embodiment of the invention, FIG. 2 is a block diagram showing a configuration of the facsimile apparatus in the embodiment, and FIG. 3 is a diagram showing a detailed configuration of a data format converter of the facsimile apparatus in the embodiment of the invention.

In FIG. 1, reference numeral 1 is a facsimile apparatus main body in the embodiment of the invention. The facsimile apparatus main body 1 has an operation unit 2 for dialing to make a call. A liquid crystal display 3 displays data reception information described below, and displays image information to be transmitted by facsimile, and by using this liquid crystal display 3, the image can be checked before transmission, or the received image information or the image information of the memory card can be checked before printing. A handset 4 is for talking.

A memory card 6 can be inserted into a card slot 5. The card slot 5 is an insertion slot of a card reader-writer 28

(described later in relation to the memory card input and output unit of the invention) for exchanging image information with the memory card 6.

As the memory card, for example, SD (secure digital) memory card capable of protecting the copyright can be used. This SD memory card is a memory card of next generation having the copyright protection function strongly demanded by the leading software contents firms around the world. As the memory card, aside from the SD memory card, a memory card conforming to the personal computer card standard may be used, or Compact Flash card or Smart Media may be preferred, but the SD memory card is most preferred because the copyright can be protected.

Multiple images are stored in the memory card 6, in which a thumbnail image for displaying a list to read out a desired specific image, and a detailed image corresponding to the thumbnail image are stored. Aside from video data, audio data can be also stored in the memory card 6.

In FIG. 2, a central controller 20 controls the operation of the parts of the facsimile apparatus of the invention. The central controller 20 comprises a CPU for calculating or processing according to the ROM storing the operation program of the entire facsimile apparatus and a RAM for exchanging data with the CPU. A data storage unit 21 is composed of flash memories and others for temporarily storing transmission data and reception data such as audio data and video data received through the communication line. The data storage unit 21 can store the image data in TIFF format. A communication interface 22 connects between the communication line not shown and this facsimile apparatus, exchanges various protocol data, and transmits and receives data. A modem 23 modulates a transmission signal and demodulates a reception signal, in exchange of data with other facsimile apparatus. An operation unit 24 is shown as the operation unit 2 in FIG. 1 together with a selection input unit 31 described later. For example, the operation unit 24 makes various inputs such as setting of automatic saving by registering the destination information (telephone number, etc.) and other attributes preliminarily in order to limit the data to be stored in the memory card 6 to a specific range. A scanner 25 reads the original image, and a color image sensor is used in the embodiment.

A data format converter 26 is explained below. The data format converter 26 converts, for example, the image data of the format conforming to the ITU-T T.81 standard used in the color facsimile apparatus, into the data of JFIF format (MH data recorded directly) of TIFF which is the compression format of memory card 6 or JPEG format of DCF. It also executes conversion in reverse direction. The format conforming to the ITU-T T.81 standard is the L*a*b* format, and the data format of the compression format of memory card 6 is the YCbCr format. The data format converter 26 is composed of an exclusive digital signal processor, and the operation of data conversion is considerably complicated as mentioned below, but is executed at high speed. In this case, the data format converter 26 converts by making use of the relation of the following formulas 1, 2, 3 and 4.

$$L^* = \begin{cases} 25\left(\frac{100Y}{Y_0}\right)^{\frac{1}{3}} - 16 & Y/Y_0 > 0.008856 \\ 903.29 Y/Y_0 & Y/Y_0 \leq 0.008856 \end{cases} \quad \text{[Formula 1]}$$

$$a^* = 500[(X/X_0)^{1/3} - (Y/Y_0)^{1/3}]$$

$$b^* = 200[(Y/Y_0)^{1/3} - (Z/Z_0)^{1/3}]$$

$$\begin{pmatrix} X \\ Y \\ Z \end{pmatrix} = \begin{pmatrix} 0.61 & 0.17 & 0.20 \\ 0.30 & 0.59 & 0.11 \\ 0.00 & 0.07 & 1.12 \end{pmatrix} \begin{pmatrix} R \\ G \\ B \end{pmatrix} \quad \text{[Formula 2]}$$

[Formula 3]

$$Y = 0.299R + 0.587G + 0.114B$$

$$Cr = 0.713(R-Y) + 128$$

$$Cb = 0.564(B-Y) + 128$$

$$\begin{pmatrix} R \\ G \\ B \end{pmatrix} = \begin{pmatrix} 1.89 & -0.51 & -0.29 \\ -0.97 & 1.89 & -0.02 \\ 0.06 & -0.12 & 0.89 \end{pmatrix} \begin{pmatrix} X \\ Y \\ Z \end{pmatrix} \quad \text{[Formula 4]}$$

Meanwhile, since the data of the YCbCr format is the data format that can be digitally processed by personal computer or digital camera, the data stored in the memory card 6 can be directly processed by personal computer or digital camera.

Conversion from RGB format to L*a*b* format is operated as shown in formulas 1 and 2 through three stimuli X, Y, Z. Herein, X0, Y0, and Z0 are three stimuli of illuminated light, with Y0=100. By inverse function, L*a*b* can be converted into RGB of three primaries. That is, by inverse function of formula 1, three stimuli X, Y, Z are determined from L*, a*, and b*, and further R, G, and B are obtained from formula 4. Colors R, G, B are three primaries designated by the CIE (International Commission on Illumination).

Conversion from RGB format to YCbCr format is operated according to formula 3. By inverse function of formula 3, YCbCr can be converted to RGB. That is, by giving Cb and Cr to second line and third line of formula 3, a relational formula of R, G, and Y is deduced, and when it is combined with first line of formula 3, R, G, and B are obtained. The specific configuration of the data format converter 26 and conversion management are described later.

In FIG. 2, successively, a printer 27 prints out the received facsimile image data as color image or monochromatic image. The card reader-writer 28 exchanges data with the memory card 6. An audio output unit 29 converts the incoming audio data from digital to analog signal, and amplifies and issues. The handset 4 shown in FIG. 1 is also included therein. A display unit 30 displays data reception information, thumbnail image, detailed image and others in the liquid crystal display 3. A selection input unit 31 selects the data to be saved in the memory card 6 if the received data is monochromatic image data, gives instruction of saving to the memory card 6, or enters the thumbnail image number for checking the image at the time of transmission. The operation unit 2 shown in FIG. 1 is composed of the selection input unit 31 and operation unit 24.

The display unit 30 shows a list of thumbnail images for specifying an image when the facsimile apparatus transmits or prints the image. By observing the display, the user enters the thumbnail image number through the selection input unit 31, and the display unit 30 and central controller 20 look for the detailed image related with this thumbnail image number, and read out from the memory card 6 through the card reader-writer 28. The read detailed image data is opened by the display unit 30, and a magnified detailed image is shown on the liquid crystal display 3. Further, relating to the reception process, the display unit 30 shows a list of various data stored in the data storage unit 21 received from the communication line, and displays the reception information of all received data. As a result, the reception data can be selected, and aside from the data directly saved in the memory card 6, it is processed whether to save as data, print out, or discard the data. A memory management unit 32 manages the data stored in the data storage unit 21.

A data conversion management unit 33 judges if the data receivable in the facsimile apparatus of the partner (reception side) is color or monochromatic, by using the standard function signal (DIS signal) obtained through the communication interface 22, and checks if the actual image data sent from the partner is color or monochromatic also by using the standard function signal (DCS signal). The data conversion management unit 33 determines the data format before conversion depending on whether the image data to be transmitted is read by the scanner or read from the memory card, on the basis of the judging result of the data conversion management unit 33, and instructs to convert the data to be transmitted into the data format receivable at the reception side, to the data format converter 26. Also checking if the actual image data sent from the partner is color or monochromatic, conversion of data format is instructed to the data format converter 26.

Processing at the data conversion management unit 33 is specifically explained below. In the facsimile apparatus of the invention, every time one image file is handled, items of pre-conversion format flag and post-conversion format flag are provided in relation to the file. The data conversion management unit 33 detects the data format before conversion depending on whether the image file to be handled is read by the scanner or read from the memory card, and an RGB flag is set up as the pre-conversion format flag in the case of the file entered by scanner reading, and a YCbCr flag is set up in the case of the file entered from the memory card.

The data conversion management unit 33, when recognizing the object format after conversion, sets the color flag or monochrome flag in the post-conversion format flag. For example, in the case of facsimile transmission, the data conversion management unit 33 discriminates the standard function signal (DIS signal) obtained from the partner, and when judging to transmit monochromatic image because the destination side is a monochromatic facsimile apparatus, a monochrome flag is set, and it is instructed to the data format converter 26 to issue MH data. The data format converter 26 converts to a proper data format according to the instruction from the data conversion management unit 33. Therefore, whether the data of RGB format is entered in the input port of RGB of the data format converter 26, or the data of YCbCr format is entered in the input port of YCbCr, the MH data is issued from the output port of MH. Thus, the data conversion management unit 33 determines the content of post-conversion format flag depending on the purpose of each processing. Further, the data conversion management unit 33 manages and executes the process (separation and provision) of various headers attached to the data. The MH data is one of compression formats of monochromatic facsimile, and the TIFF format supports the MH data format.

A TIFF format converter 34 converts the data stored, for example, in the data storage unit 21 or memory card 6 into the TIFF format. That is, the TIFF format converter 34 generates a TIFF format file header and an image file directory (IFD), and then generates transmission side information, information of NSS, TSI, and DCS signal, cell length and width, and resolution information, and further creates one file by adding reception data, and stores in the memory card 6 or data storage unit 21.

A specific configuration for image data transmission of the data format converter 26 and its operation are explained below.

In FIG. 3, a first converter 39 converts the color image data of YCbCr format stored, for example, in the memory card 6 once into data of RGB format (YCbCr to RGB). The data of RGB format issued from the first converter 39 is put into a second converter 35. The second converter 35 encodes the data of RGB format read by the scanner 25 into $L^*a^*b^*$ format (RGB to $L^*a^*b^*$). The second converter 35 also encodes the data of RGB format issued from the first converter 39 into the $L^*a^*b^*$ format.

The first converter 39, according to formula 3, returns the YCbCr format used for color expression of digital image to the RGB format. The second converter 35 converts the data of RGB format into data of $L^*a^*b^*$ format according to formula 1 and formula 2.

An $L^*$ portion extractor 36 extracts data of $L^*$ component out of $L^*a^*b^*$ format data converted by the second converter 35. The $L^*$ component expresses luminance, and $a^*b^*$ component shows a color difference, and therefore by extracting the $L^*$ component, a monochromatic image can be created. A gamma corrector 37 performs gamma correction on the $L^*$ component extracted by the $L^*$ component extractor 36, so that the obtained binary data may be free from distortion. An MH converter 38 compresses and encodes the binary data issued from the gamma corrector 37. By the $L^*$ component extractor 36, gamma corrector 37, and MH converter 38, a monochromatic format converter is composed for converting from the $L^*a^*b^*$ format into monochromatic MH data format. Herein, if gamma correction is not performed, the binary data may be distorted, and therefore the gamma corrector 37 is indispensable for improving the picture quality of the monochromatic image after conversion. The MH converter 38 is to perform MH (modified Huffman) coding, which is based on run-length coding.

At the time of transmission, whether conversion by the second converter 35 or conversion by the first converter 39 is done first depends on the input by the user. That is, depending on whether the user selects to scan the original by the scanner and transmit or to transmit from the memory card, the pre-conversion format flag is set, and either one of the two data conversions is determined. The pre-conversion flag is RGB flag in the case of scanning of original, and YCbCr flag is set in the case of memory card transmission.

Operation of facsimile transmission of color image data stored in the memory card 6 is explained.

When the data conversion management unit 33 judges to transmit monochromatic image because the destination side is a monochromatic facsimile apparatus, the data is converted in the following flow. The first converter 39 converts the compression format (YCbCr) of memory card to RGB format (three primaries), and the second converter 35 converts from RGB to $L^*a^*b^*$ format, then the monochromatic format converters 36, 37, and 38 convert from the $L^*a^*b^*$ format to the monochromatic facsimile format (MH data).

On the other hand, when the destination side is capable of receiving color image data, and the data conversion management unit 33 judges to convert to color image data, by setting up color flag as the post-conversion format flag, it is instructed to the data format converter 26 to issue data in $L^*a^*b^*$ format. According to the instruction, whether data of RGB format is entered in the input port of RGB of the data format converter 26 or data of YCbCr format is entered in the input port of YCbCr, they are converted into the L*a*b* format, and issued from the L*a*b* output port of the data format converter 26.

Thus, if the destination side is a monochromatic facsimile apparatus, and when sending the color image stored in the memory card 6 or color image read by the scanner 25, the image can be transmitted immediately without any feeling of mismatching of the data formats by the function of the data format converter 26.

A specific configuration for reception of image data of the data format converter 26 and its operation are explained below.

The data format converter 26 has the following configuration for reception of image data. In FIG. 3, reference numeral 40 is a monochromatic compression format converter. Reference numeral 41 is a third converter for converting from L*a*b* format to RGB format (L*a*b* to RGB), and 42 is a fourth converter for converting from RGB format to YCbCr format (RGB to YCbCr).

When receiving MH data showing monochromatic image, the MH data is entered into the monochromatic compression format converter 40 from the MH input port. The monochromatic compression format converter 40 issues the MH data from the MH output port without conversion unless the selection input unit 31 instructs to convert into other compression data format than MH format (default). If conversion into other compression data format (MR format, MMR format, etc.) is specified, the data is issued in the converted format from the output port of other format. The reason is that the TIFF format supports the MH data format, and when the TIFF format is employed for the memory card 6, the MH data can be directly stored in the memory card 6, and processing is very simple. However, if there is other reason for further raising the compression rate, it is necessary to convert into other data format.

When receiving data of L*a*b* format showing color image, the L*a*b* format is entered into the third converter 41 (L*a*b* to RGB) from the L*a*b* input port. This L*a*b* format conforms to formula 1 and formula 2, and the compressed data of ITU-T T.81 standard is once decoded, and the RGB format is obtained. This RGB format is then sent into the fourth converter 42 (RGB to YCbCr), and is compressed and encoded into the YCbCr format for color expression of digital image, and is issued from the YCbCr output port. The issued YCbCr format is saved in the memory card 6.

The functions of the image converters are summarized as follows.

First converter 39: To convert from YCbCr format to RGB format.

Second converter 35: To convert from RGB format to L*a*b* format.

Monochromic format converters (36, 37, 38): To convert from L*a*b* format to monochromatic MH data format.

Monochromatic compression format converter 40: To issue received MH format without conversion, or to convert into other specified format and issue in data format after conversion.

Third converter 41: To convert from L*a*b* format to RGB format.

Fourth converter 42: To convert from RGB format to YCbCr format.

When receiving distribution of audio data, the audio compression format of MP3 (MPEG Audio Layer 3) format or AAC (Advanced Audio Coding) format is converted into the data format for memory card 6. Since the data format converter 26 has such conversion function, the audio data stored in the memory card 6 can be immediately reproduced by a personal computer or a reproducing apparatus. In this case, a memory card having copyright protection function (such as SD memory card) is necessary.

Figure 4A:
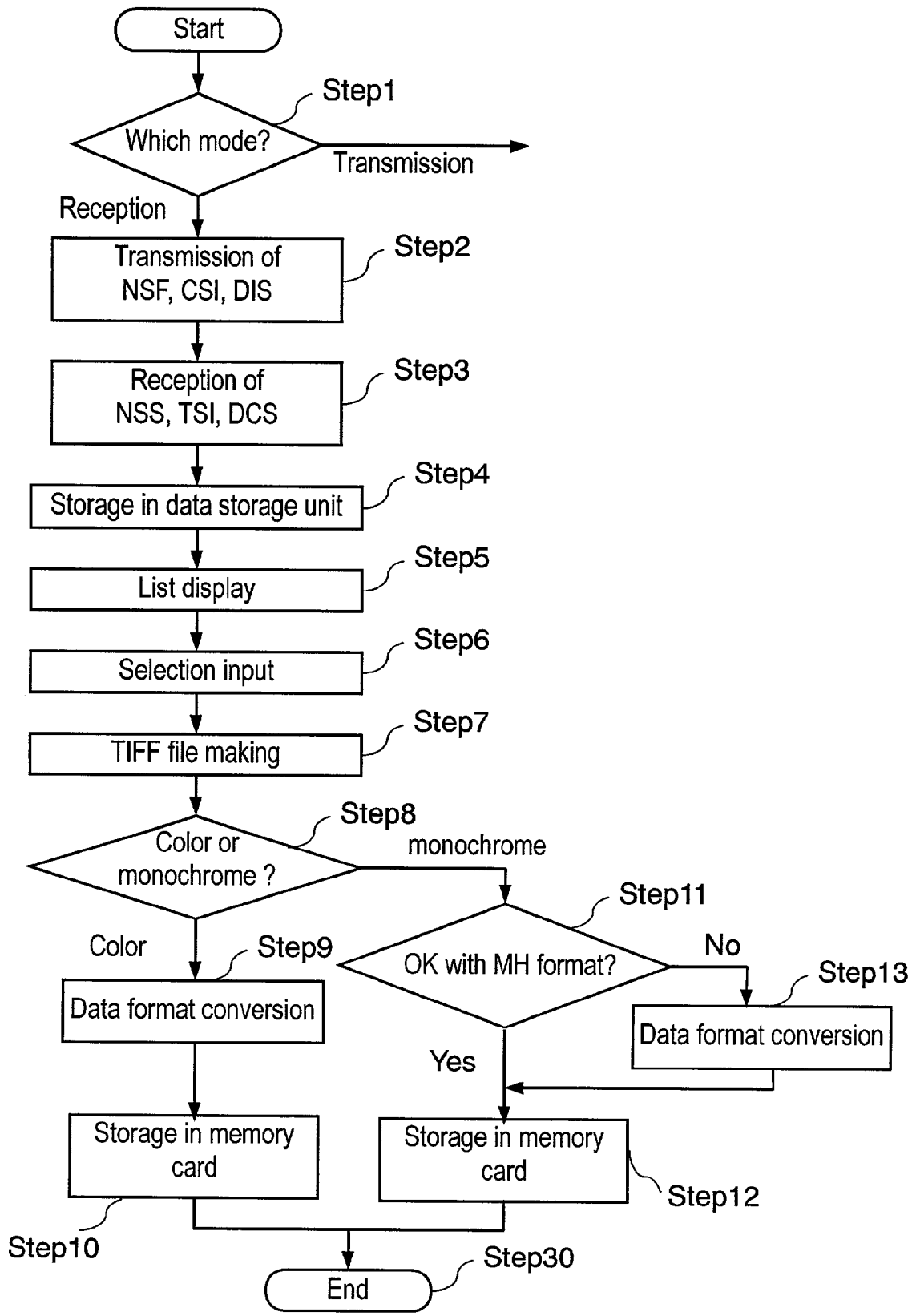
FIG. 4 is a flowchart showing a processing flow of the facsimile apparatus in the embodiment of the invention.
Figure 4B:
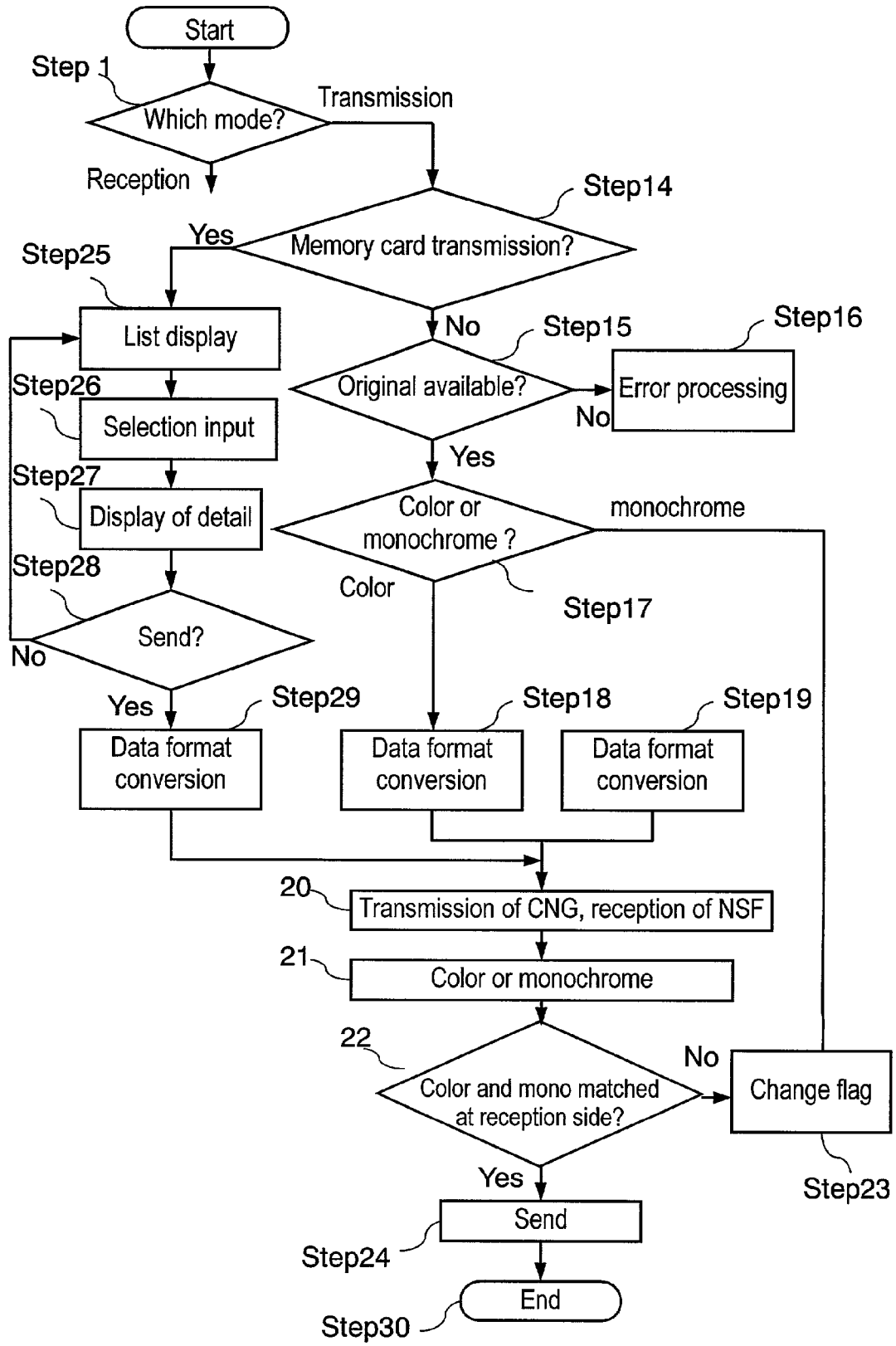
Figure 5:
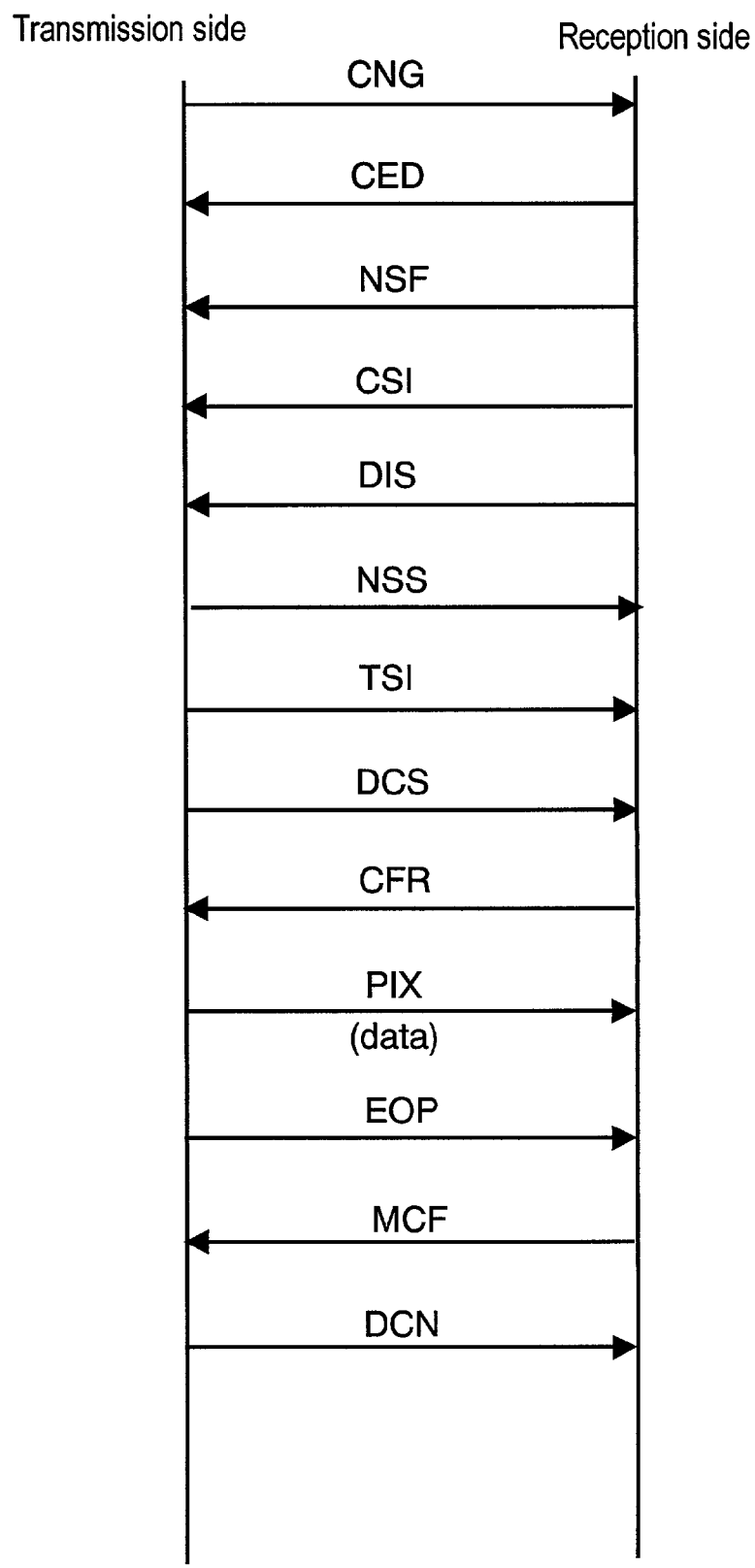
FIG. 5 is a diagram showing the sequence of transmission and reception signals of the facsimile apparatus in the embodiment of the invention.

The operation of the facsimile apparatus having such configuration is explained in detail by referring to the operation flowchart in FIG. 4, and the signal sequence in FIG. 5. FIG. 4 is a flowchart showing a processing flow of the facsimile apparatus in the embodiment of the invention, and FIG. 5 is a diagram showing the sequence of transmission and reception signals of the facsimile apparatus in the embodiment of the invention.

First, the operation of receiving data in this facsimile apparatus is explained by referring to FIG. 4A.

When receiving data, a CNG signal from the facsimile apparatus of the transmission side is received, the facsimile apparatus at the reception side transfers from step 1 to step 2 as shown in FIG. 4 and FIG. 5, and NSF signal, CSI signal, and DIS signal are transmitted to the facsimile apparatus of the transmission side. As a result, after receiving the NSS signal, TSI signal, and DCS signal, and sending the CFR signal, data such as image data is received (step 3).

After the header for communication is removed, the data after the header is stored in the data storage unit 21 composed of flash memory and others (step 4). A list of data stored in the data storage unit 21 (reception time and date, number of pages, partner information) is displayed in the liquid crystal display 3 (step 5). When the user selects the data to be saved by the selection input unit 31 (step 6), the data conversion management unit 33 develops the selected data from the data storage unit 21 into the internal memory of the data conversion management unit 33, generates TIFF format file header and image file directory (IFD) in the TIFF format converter 34, and creates one TIFF file comprising partner information, NSS signal information, cell length and width, copyright protection information, and reception data (step 7).

Consequently, the data conversion management unit 33 checks if the information of DCS signal is written in the IFD or not (step 8), and when the information of DCS signal is detected, it is judged if color image data or monochromatic image data, and a color flag or monochrome flag is set up.

With the color flag being set up, when the data conversion management unit 33 judges that the received data is color image data, the process goes to step 9, and the data conversion management unit 33 instructs the data format converter 26 to convert the data format of the color image data stored in the data storage unit 21 from the L*a*b* format to the YCbCr format as the compression format of the memory card 6 (step 9). The data format converter 26 converts in two stages by the third converter 41 and fourth converter 42, and converts the data into the YCbCr format. Then the data conversion management unit 33 converts the YCbCr format into the TIFF format by the TIFF format converter 34, stores in the memory card 6 (step 10), and updates the management information of the memory management unit 32, thereby processing to end (step 30).

At step 8, with the monochrome flag being set up, when the data conversion management unit 33 judges that the received data is monochromatic image data, going to step 11, the data conversion management unit 33 checks whether or not to convert the data format from the MH data, and if being set to store directly in the MH format, the MH data is directly stored in the memory card 6 (step 12). If being set to convert to other format from the MH data, the data format converter 26 converts it (step 13), and stores in the memory card 6 (step 12), and updates the data management information of the memory management unit 32, thereby processing to end (step 30).

The transmission process is explained.

In the case of transmission, transferring from step 1 to step 14 in FIG. 4B, the user manipulates the operation unit 24 to set whether to transmit, by the facsimile apparatus, the image taken by digital camera and stored in the memory card 6 or to transmit the paper original by reading by the scanner 25. As a result, as the pre-conversion format flag, an RGB flag is set up in the case of original transmission, or a YCbCr flag in the case of memory card transmission.

At step 14, if not transmitting from the memory card 6, going to step 15, it is judged if the original is set in the facsimile apparatus main body 1 or not.

If the original is not set, going to step 16, error processing is done by, for example, displaying a message "Original is not set" or the like in the liquid crystal display 3. When the original is being set, on the other hand, the process goes to step 17. The user manipulates the operation unit 24, and selects either color image transmission or monochromatic image transmission. At step 17, waiting for input by the user, when an input is made, the data conversion management unit 33 sets either a color flag or a monochrome flag, and judges the input (step 17).

If the RGB flag is set (in the case of original transmission) and the color flag (color image) is set up, the data conversion management unit 33 instructs the data format converter 26 to convert the data format from the RGB format to the L*a*b* format (step 18). At step 18, the image of the original being read by the scanner 25 is converted into the image data of JPEG format (L*a*b* format) conforming to the ITU-T T.81 standard of the color facsimile standard by the second converter 35 (RGB to L*a*b*) of the data format converter 26.

By contrast, when the RGB flag is set (in the case of original transmission) and the monochrome flag (monochrome image) is set up, the data conversion management unit 33 converts into the MH data (step 19). That is, in the case of monochromatic image, the second converter 35 once converts into the L*a*b* format, and the L* component extractor 36 extracts the L* component, the gamma corrector 37 performs gamma correction, and the MH converter 38 converts into MH data.

Afterwards, the CNG signal is sent out from the communication interface 22, and the NSF signal, CSI signal, and DIS signal are received (step 20). The data conversion management unit 33, making use of the standard function signal (DIS signal) obtained through the communication interface 22, judges if the data receivable in the facsimile apparatus of the destination side is color image data or monochromatic image data (step 21).

When the type of the data (color image data or monochromatic image data) receivable in the facsimile apparatus of the destination side and the post-conversion format flag (color or monochrome) entered already by the user are matched (step 22), the transmission is processed directly.

However, if the post-conversion format flag entered by the user and the type of the data receivable in the facsimile apparatus of the destination side are different, the post-conversion format flag is partly changed. With the color flag being set, when only monochromatic image transmission is judged at the partner, this judgement is dominant, and the color flag is changed to the monochrome flag by force (step 23), and returning once to step 19, the L* component extractor 36 extracts the L* component, the gamma corrector 37 performs gamma correction, and the MH converter 38 converts into MH data. After thus converting into the MH data, transmission is processed again (step 24).

On the other hand, when transmission from memory card 6 is set at step 14, going to step 25, the central controller 20 controls the card reader-writer 28, and displays a list of data stored in the memory card 6 in the liquid crystal display 3. For example, a list of images stored in the memory card 6 is displayed in the liquid crystal display 3 by thumbnail format. The user manipulates the selection input unit 31, and enters the image to be transmitted from the displayed list (step 26). As a result, the detailed image of the specified number is displayed in the liquid crystal display 3 (step 27). At steps 25 and 27, instead of displaying in the liquid crystal display, the image may be printed out by the printer 27.

At step 28, viewing this image, the user decides whether or not to transmit this image actually, and when transmitting, the process goes to step 29. At step 29, the data conversion management unit 33 instructs the data format converter 26 data conversion from the YCbCr format to L*a*b* format. After converting the data format, going to step 20, the transmission is processed. That is, same as mentioned above, a CNG signal is sent out from the communication interface 22, and NSF signal and others are received (step 20), and it is known if the data receivable in the facsimile apparatus of the destination side is color or monochromatic (step 21). When the type of the data receivable in the facsimile apparatus of the destination side and the post-conversion format flag (color or monochrome) are matched (step 22), the transmission is processed directly.

However, if the post-conversion format flag is color and the destination side is monochromatic facsimile apparatus, the post-conversion format flag is partly changed. That is, the color flag is changed to the monochrome flag by force (step 23), and going to step 19, the MH converter 38 converts the L*a*b* format into MH data, and transmission is processed (steps 20, 21, 22, 24). As a result, if the destination side is monochromatic facsimile apparatus, the facsimile apparatus of the invention can automatically transmit the color image of the memory cord 6 as a monochromatic image.

In the foregoing explanation, it is explained to transmit by converting directly from the memory card 6, but the storage content of the memory card 6 may be once transferred to the data storage unit 21, and then transmitted by converting data from the data storage unit 21 in the same procedure as when transmitting by converting from the memory card 6. In this case, the memory card 6 must be immediately put back into the digital camera or personal computer, but it is convenient when transmitting later.

When transmitting thus from the memory card 6, the transmission data content may be also stored in the data storage unit 21 at the time of transmission, and in this case, the data may be stored either in the transmission data format or in the same format as in the memory card 6.

By these methods, records of the transmitted data can be saved.

This facsimile apparatus usually comprises a scanner, but the scanner may be optional and added later, or the image may be taken in by a device having a scanner, and stored in the memory card 6, and this memory card 6 may be installed in a device without scanner, and the data can be transmitted.

According to the facsimile apparatus of the embodiment, as described herein, if the facsimile apparatus of the destination side can receive a monochromatic image only, the color image recorded in the memory card or the color image read by the scanner is automatically converted into a monochromatic image and transmitted, and therefore the image can be transmitted to the monochromatic facsimile apparatus at high picture quality. In particular, when transmitting the color image data stored in the memory card to the destination side capable of receiving monochromatic image only, it can be transmitted by automatically converting to monochromatic image data, so that the image of high picture quality can be easily and directly transmitted from the memory card 6 without using paper.

Moreover, the second converter 35 (RGB to L*a*b*) necessary when the destination side is a color facsimile apparatus can be shared also if the destination side is a monochromatic facsimile apparatus.

Further, any image data distributed from a communication line can be stored in the memory card by automatically converting into the data format for memory card for digital image processing, so that the image data may be easily processed in personal computer or the like.

As the memory card, a memory card with copyright protection function can be used, and the data can be automatically stored therein, and it is excellent in respect of security, and the facsimile apparatus in sufficient consideration of copyright problems can be realized.

What is claimed is:

1. A facsimile apparatus comprising:
   a) a modem for modulating data to be transmitted through a communication line and demodulating received data;
   b) a scanner for reading the original image;
   c) a memory card input and output unit for writing data into a memory card and reading data out of the memory card, the memory card being loaded in said memory card input and output unit;
   d) a first converter for converting the data of YCbCr format being read out from the memory card into data of RGB format; and
   e) a second converter for converting the data of RGB format being read out by the scanner and the data of RGB format being converted by said first converter into image data of L*a*b* format used in the facsimile apparatus.

2. The facsimile apparatus of claim 1, wherein the memory card is a memory card with copyright protection function.

3. A facsimile apparatus comprising:
   a) a modem for modulating data to be transmitted through a communication line and demodulating received data;
   b) a scanner for reading an original image;
   c) a memory card input and output unit for writing data into a memory card and reading data out of the memory card, the memory card being loaded in said memory card input and output unit;
   d) a data conversion management unit for judging a type of image data receivable in a destination side facsimile apparatus, the type of receivable image data being either color image or monochromatic image;
   e) a first converter for converting data of YCbCr format being read out from the memory card into data of RGB format;
   f) a second converter for converting data of RGB format being read out by the scanner and data of RGB format being converted by said first converter into data of L*a*b* format used in the facsimile apparatus; and
   g) a monochromatic format converter for converting data of L*a*b* format into data of monochromatic format, wherein when the type of the receivable image data is color image, the facsimile apparatus transmits data of L*a*b* format to the destination side facsimile apparatus, and when the type of receivable image data is monochromatic image, the facsimile apparatus transmits data of monochromatic format to the destination side facsimile apparatus.

4. The facsimile apparatus of claim 3, wherein said monochromatic format converter includes L* component extractor and MH converter, and said L* component extractor extracts L* component and converts into binary data by performing gamma correction, and said MH converter converts the binary data into MH format data.

5. A facsimile apparatus comprising:
   a) a modem for modulating a data to be transmitted through a communication line and demodulating a received data;
   b) a memory card input and output unit for writing data into a memory card and reading data out of the memory card, the memory card being loaded in said memory card input and output unit;
   c) a data conversion management unit for judging a type of image data receivable in a destination side facsimile apparatus; and
   d) a data format converter for converting a color image data into a data format for color facsimile transmission and reception and converting the converted color image data into a data format for monochromatic facsimile transmission when the image data receivable at the destination side is monochromatic image data.

6. The facsimile apparatus of claim 5, wherein said data format converter comprises:
   1) first converter for converting the data of YCbCr format being read out from the memory card into data of RGB format;
   2) second converter for converting the data of RGB format being converted by the first converter into data of L*a*b* format; and
   3) monochromatic format converter for converting the data of L*a*b* format being converted by the second converter into data of monochromatic MH format.

7. The facsimile apparatus of claim 6, wherein said monochromatic format converter includes L* component extractor and MH converter, and said L* component extractor extracts L* component and converts into binary data by performing gamma correction, and said MH converter converts the binary data into MH format data.

8. A facsimile apparatus comprising:
   a) a modem for modulating data to be transmitted through a communication line and demodulating received data;
   b) a memory card input and output unit for writing data into a memory card and reading data out of the memory card, the memory card being loaded in said memory card input and output unit;
   c) a data storage unit for storing data being transmitted or received;
   d) data conversion management unit for judging a type of image data receivable in a destination side facsimile apparatus; and
   e) data format converter for converting a format of image data being transmitted or received,
   wherein said data format converter encodes a color image data into L*a*b* format for color facsimile transmission and reception, and further issues by converting into a MH data format by the monochromatic format converter, when the type of image data judged by the data conversion management unit at the time of transmission is monochromatic image data, issues the received MH format data as it is, or issues by converting into data of specified format, when the type of image data judged by the data conversion management unit at the time of reception is monochromatic image data, or converts the received data into data of RGB format, and further issues by converting the data of RGB format into data of YCbCr format, when the type of image data judged by the data conversion management unit at the time of reception is color image data.

9. The facsimile apparatus of claim 8, wherein said monochromatic format converter comprises L* component extractor and MH converter, and, when obtaining a monochromatic format, the L* component extractor extracts L* component and converts into binary data by performing gamma correction, and the MH converter converts the binary data into MH format data.

10. The facsimile apparatus of claim 8, wherein a content of the memory card loaded in the memory card input and output unit is transferred to the data storage unit, and converted in the format converter and transmitted.

11. The facsimile apparatus of claim 8, wherein the data to be transmitted after conversion in the format converter is stored in the data storage unit.

12. The facsimile apparatus of claim 8, further comprising a scanner for reading the original image, wherein said data format converter includes:
1) first converter for converting from YCbCr format into data of RGB format;
2) second converter for converting from RGB format into data of L*a*b* format;
3) monochromatic format converter for converting from L*a*b* format into data of monochromatic MH format;
4) third converter for converting from L*a*b* format into data of RGB format;
5) fourth converter for converting from RGB format into data of YCbCr format; and
6) monochromatic compression format converter for issuing the received MH format data without conversion, or converting into specified format and issuing in converted data format.

13. The facsimile apparatus of claim 12, wherein said monochromatic format converter comprises L* component extractor and MH converter, and, when obtaining a monochromatic format, the L* component extractor extracts L* component and converts into binary data by performing gamma correction, and the MH converter converts the binary data into MH format data.

14. The facsimile apparatus of claim 12, wherein a content of the memory card loaded in the memory card input and output unit is transferred to the data storage unit, and converted in the format converter and transmitted.

15. The facsimile apparatus of claim 12, wherein the data to be transmitted after conversion in the format converter is stored in the data storage unit.

16. A facsimile apparatus comprising:
a modulator for modulating a data to be transmitted through a communication line;
a scanner for reading an original image;
a recording medium input and output unit for writing data into a recording medium and reading data out of the recording medium, the recording medium being loaded in said recording medium input and output unit;
a first converter that converts color image data of a first format being read out from the recording medium into color image data of a second format; and a second converter that converts color image data of the second format into color image data of a third format.

17. The facsimile apparatus of claim 16, wherein the first format is YCbCr, the second format is RGB and the third format is L*a*b*.

18. The facsimile apparatus of claim 16, wherein the recording medium is a memory card.

19. A facsimile apparatus comprising:
a modulator for modulating a data to be transmitted through a communication line;
a scanner for reading an original image;
a recording medium input and output unit for writing data into a recording medium and reading data out of the recording medium, the recording medium being loaded in said recording medium input and output unit;
a data conversion management unit that determines whether a destination side facsimile apparatus is capable of receiving only color image or only monochromatic image;
a first converter that converts color image data of a first format being read out from the recording medium into color image data of a second format;
a second converter that converts color image data of the second format into color image data of a third format;
a monochromatic format converter that converts color image data of the third format into data of a monochromatic format,
wherein when the data conversion management unit determines that the destination side facsimile apparatus is capable of receiving only color image, the facsimile apparatus transmits color image data of the third format to the destination side facsimile apparatus, and
when the data conversion management unit determines that the destination side facsimile apparatus is capable of receiving only monochromatic image, the facsimile apparatus transmits data of the monochromatic format to the destination side facsimile apparatus.

20. The facsimile apparatus of claim 19, wherein the first format is YCbCr, the second format is RGB and the third format is L*a*b*.

21. The facsimile apparatus of claim 19, wherein the recording medium is a memory card.

22. A facsimile apparatus comprising:
a modulator for modulating a data to be transmitted through a communication line;
a recording medium input and output unit for writing data into a recording medium and reading data out of the recording medium, the recording medium being loaded in said recording medium input and output unit;
a data conversion management unit that determines whether a destination side facsimile apparatus is capable of receiving only color image or only monochromatic image; and
a data format converter that converts the color image data stored in the recording medium into a data format for color facsimile transmission, and converts a data format for color facsimile transmission into a data format for monochromatic facsimile transmission when the destination side facsimile apparatus is capable of receiving only monochromatic image data.

23. The facsimile apparatus of claim 22, wherein the first format is YCbCr, the second format is RGB and the third format is L*a*b*.

24. The facsimile apparatus of claim 22, wherein the recording medium is a memory card.

25. A method of transmitting color image data in a facsimile apparatus comprising the steps of:

loading color image data of a first format from a recording medium;

converting the color image data of the first format into color image data of a second format;

converting the color image data of the second format into color image data of a third format; and transmitting the color image of the third format via a communication line.

26. The method of claim 25, wherein the first format is YCbCr, the second format is RGB and the third format is L*a*b*.

27. The method of claim 25, wherein the recording medium is a memory card.

28. A method of transmitting color image data in a facsimile apparatus comprising the steps of:

loading color image data of a first format from a recording medium;

converting the color image data of the first format into color image data of a second format;

converting the color image data of the second format into color image data of a third format;

converting the color image data of the third format into monochromatic image data; and transmitting the monochromatic image data via a communication line.

29. The method of claim 28, wherein the first format is YCbCr, the second format is RGB and the third format is L*a*b*.

30. The method of claim 28, wherein the recording medium is a memory card.

31. A method of transmitting color image data in a facsimile apparatus comprising the steps of:

determining whether a destination side facsimile apparatus is capable of receiving only color image data or only monochromatic image data;

loading color image data of a first format from a recording medium;

converting the color image data of the first format into color image data of a second format;

converting the color image data of the second format into color image data of a third format;

converting the color image data of the third format into monochromatic image data when the destination side facsimile apparatus can receive only monochromatic data according to the step of determination; and transmitting the monochromatic image data or the color image data of the third format via a communication line in response to the step of determination.

32. The method of claim 21, wherein the first format is YCbCr, the second format is RGB and the third format is L*a*b*.

33. The method of claim 31, wherein the recording medium is a memory card.

* * * * *